(12) United States Patent
Ekstrom et al.

(10) Patent No.: US 7,139,384 B1
(45) Date of Patent: Nov. 21, 2006

(54) SYSTEM AND METHOD FOR MIXED MODE COMMUNICATIONS IN AN ADVANCED INTELLIGENT NETWORK TELEPHONE SYSTEM

(75) Inventors: Gayle Roberta Ekstrom, Chicago, IL (US); Thomas Joseph McBlain, Arlington Heights, IL (US); Howard Mark Nodell, Buffalo Grove, IL (US)

(73) Assignee: SBC Properties, L.P., Reno, NV (US)

( * ) Notice: Subject to any disclaimer, the term of this patent is extended or adjusted under 35 U.S.C. 154(b) by 1274 days.

(21) Appl. No.: 09/649,831

(22) Filed: Aug. 29, 2000

Related U.S. Application Data

(63) Continuation of application No. 08/963,694, filed on Nov. 4, 1997, now Pat. No. 6,148,069.

(51) Int. Cl.
*H04M 7/00* (2006.01)
*H04M 3/42* (2006.01)

(52) U.S. Cl. .............................. 379/221.08; 379/207.02
(58) Field of Classification Search ...................... None
See application file for complete search history.

(56) References Cited

U.S. PATENT DOCUMENTS

| | | | |
|---|---|---|---|
| 4,827,500 A | 5/1989 | Binkerd et al. | |
| 5,369,695 A | 11/1994 | Chakravarti et al. | |
| 5,425,090 A | 6/1995 | Orriss | |
| 5,428,608 A | 6/1995 | Freeman et al. | |
| 5,430,719 A | 7/1995 | Weisser, Jr. | |
| 5,438,568 A | 8/1995 | Weisser, Jr. | |
| 5,463,616 A | 10/1995 | Kruse et al. | |
| 5,479,495 A | 12/1995 | Blumhardt | |
| 5,499,290 A * | 3/1996 | Koster | 379/242 |
| 5,517,562 A | 5/1996 | McConnell | |
| 5,519,772 A | 5/1996 | Akman et al. | |
| 5,526,413 A | 6/1996 | Cheston, III et al. | |
| 5,528,675 A | 6/1996 | Chen | |
| 5,537,466 A | 7/1996 | Taylor et al. | |
| 5,566,235 A | 10/1996 | Hetz | |
| 5,572,583 A * | 11/1996 | Wheeler et al. | 379/221.09 |
| 5,793,839 A * | 8/1998 | Farris et al. | 379/32.03 |
| 5,901,284 A * | 5/1999 | Hamdy-Swink | 713/200 |

OTHER PUBLICATIONS

Ericsson SCP-IP Interface Function Requirements No. EAU/T/S 1056-P8AIN/012 Uen published prior to Nov. 4, 1997.
Ericsson GR-1129E SCP-IP Interface Requirement Specification published prior to Nov. 4, 1997.
Ericsson Protocol for SCP-IP Interface, Phase 1 No. EAU/T/S 1056-P8AIN/013 Uen published prior to Nov. 4, 1997.
Bellcore GR-1129-Core: Switch-Intelligent Peripheral Interface dated Sep. 1997.
European Telecommunication Standard ETS 300 374-1 Intelligent Network (IN); Intelligent Network Capability Set 1 (CS1); Core Intelligent Network Application Protocol (INAP) part 1: Protocol Specification, dated Nov. 1993.

(Continued)

*Primary Examiner*—Creighton Smith
*Assistant Examiner*—Joseph T Phan
(74) *Attorney, Agent, or Firm*—Brinks Hofer Gilson & Lione

(57) ABSTRACT

A system and method of processing calls in a telephone network having advanced intelligent network (AIN) capabilities is provided. The method includes the step of coordinating the use of an indirect interface and a direct interface over direct and indirect data paths between a service control point and an intelligent peripheral in the telephone network. The system includes a service control point having an interface mediator for coordinating the use of the direct and indirect interfaces.

8 Claims, 4 Drawing Sheets

OTHER PUBLICATIONS

Ericsson Product information flyer entitled Intelligent Peripheral Interface (GR-1129E), published prior to Nov. 4, 1997.

Article from Midwest Engineer dated Mar. 1995, by Gayle Ekstrom, entitled The Advanced Intelligent Network.

Bellcore TA-NWT-001129: Advanced Intelligent Network (AIN) Release 1 Intelligent Peripheral (IP) Interface Generic Requirements, Isue 1, dated Sep. 1991.

Bellcore TA-NWT-00129: Advanced Intelligent Network (AIN) Intelligent Peripheral Interface (IPI) Generic Requirements, Issue 2, dated Oct. 1992.

IBM Technical Disclosure Bulletin, vol. 35, No. 3, Aug. 1992, entitled Transparent Message Routing Between An SS#7 Netowrk and X.25 Network.

* cited by examiner

SYSTEM AND METHOD FOR MIXED MODE COMMUNICATIONS IN AN ADVANCED INTELLIGENT NETWORK TELEPHONE SYSTEM

This application is a continuation of application Ser. No. 08/963,694, filed Nov. 4, 1997, now U.S. Pat. No. 6,148,069.

BACKGROUND OF THE INVENTION

This invention relates to an advanced intelligent network implementing the services of network nodes, commonly referred to as intelligent peripherals. More particularly, the present invention relates to an improved method of communication using two different types of communications interfaces between the service control point and intelligent peripheral functional blocks of an advanced intelligent network.

Recent advances in telecommunications technology allow for telecommunications providers to make available increased and more flexible telephone service customization. A relatively new technology known as the advanced intelligent network (AIN) has increased the capability of telephone networks to provide services to users. An advanced intelligent network generally includes a service control point (SCP) containing the software for AIN services, a service switching point (SSP) containing special software that allows it to identify AIN calls and communicate with the SCP, and may include one or more intelligent peripherals (IP) which are network elements containing functionality and resources which may be used to exchange information with an end-user. When a telephone call is made that would require the network to provide some type of customized call processing service, an AIN trigger is detected at the SSP and an AIN message is communicated to an SCP. Once an AIN message is received by an SCP, the various network components begin to communicate over data lines with one another.

One existing interface useful for communication between the SCP, SSP, and IP is set forth in a Bellcore publication known as the GR-1129-Core: Switch-Intelligent Peripheral Interface (hereinafter referred to as "GR-1129"). GR-1129 directs that communications between the SCP and the IP travel through the SSP. This method of communication between the network elements of an AIN permits the SSP to keep track of billing records and release the SSP-IP voice/data connection when it is no longer required while maintaining control of the original call. Additionally, the SSP can receive subsequent call processing instructions from the SCP for the same call as part of the same initial transaction, however there are several disadvantages to this method of communication between the SCP and IP. The GR-1129 interface limits non-call associated signaling capabilities. For example, the SCP cannot invoke IP resources to initiate call activity independent of the initial call. Additionally, the GR-1129 interface places a significant processing demand on the SSP because all data communications from the SCP to the IP go through the SSP and require the SSP to reformat SS7 messages from the SCP into ISDN messages to send to the IP and vice-versa.

A direct interface between an IP and an SCP is available in a publication by Ericsson entitled SCP-IP Interface Function Requirements, No. EAU/T/S 1056-P8AIN/012 Uen. This document describes one set of interface requirements for direct communication between the SCP and IP without communicating through an SSP. Although the direct interface shown in the Ericsson publication avoids congestion at an SSP, communicating all messages that pass between the SCP and IP without using the SSP circumvents useful functionality and transaction tracking available from the SSP.

DETAILED DESCRIPTION OF THE PRESENTLY PREFERRED EMBODIMENTS

A preferred embodiment of the present invention discloses a method of communication between elements of a telephone network that reduces the processing load on a switch while maintaining access to the switch's functionality. According to a first aspect of the invention, the telephone network processes telephone calls by utilizing two separate data paths between the service control point and intelligent peripheral elements of the network and coordinates the use of an indirect interface over one of the data paths and a direct interface over the other data path. An advantage of using an indirect interface in coordination with a direct interface, is that the switch in the telephone network may be bypassed during the exchange of some communications between the service control point and intelligent peripheral thereby reducing the processing load on the switch.

According to a second aspect of the invention a service control point for use with an intelligent peripheral and a switch in a telephone network is provided. The service control point preferably contains first and second interfaces, each for use on a respective one of two data paths between the service control point and intelligent peripheral. An interface mediator is included in the service control point and controls which of the interfaces is used in a given situation.

Figure 1:
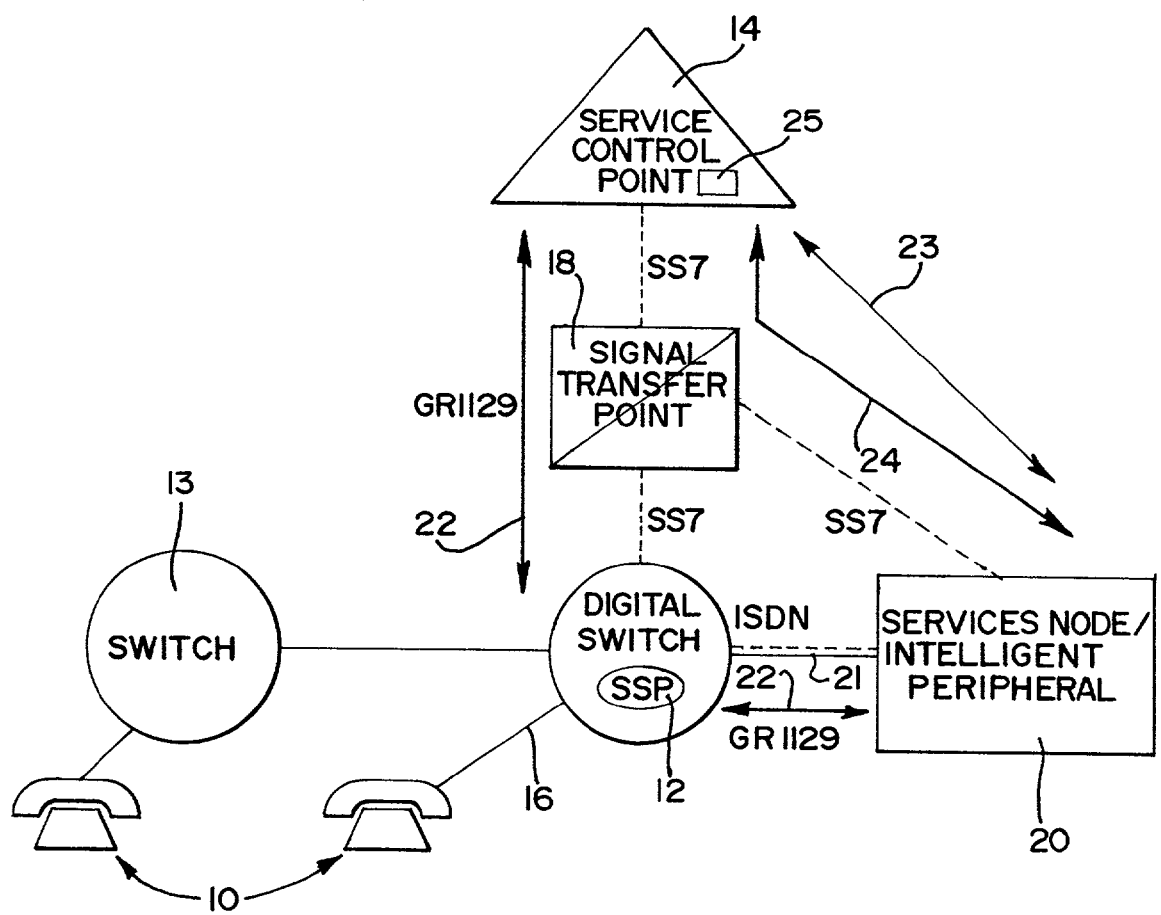
FIG. 1 is a block diagram of components in an advanced intelligent network illustrating the data communication paths in accordance with a preferred embodiment of the present method.

FIG. 1 is a block diagram of basic network elements in an advanced intelligent network (AIN) showing data and voice paths according to a preferred embodiment of the present invention. The telephone network includes an end user 10 in communication with an end office switch, more commonly known as a service switching point (SSP) 12. The SSP 12 is a programmable switch having the ability to recognize AIN triggers for calls requiring special services. The SSP 12 may be an end office or tandem switch and communicates with a service control point (SCP) 14. The end user 10 is connected to the SSP 12 over a voice/information channel 16 such as an ordinary telephone line. Multiple connections and combinations of network elements are usable with the present invention. For example, as shown in FIG. 1, an end user 10 may also communicate with a SSP 12 through one or more ordinary switches 13.

The SCP 14 is a network element in the AIN containing logic and data necessary to provide the functionality required for the execution of a desired communications service. For example, the SCP 14 can contain call control service software that blocks certain numbers predetermined to be restricted to callers calling from a particular location. In this example, the call control service function would compare a dialed number with a list of restricted numbers to see if the call is permissible. An SCP 14 generally permits separation of service logic from switching functionality so that additional services may be developed without the need to alter the equipment or logic used in each individual SSP 12. A suitable SCP 14 is the AXE SCP manufactured by Ericsson Inc. The SCP 14 is preferably in communication with the SSP via a signal transfer point (STP) 18. The STP 18 routes signals between different network elements. A suitable data signaling standard for use in a preferred embodiment of the present invention is the American National Standards Institute (ANSI) Signaling System No. 7 (SS7).

As shown in FIG. 1, the SCP 14 may communicate with an intelligent peripheral (IP) 20 using either of two data paths. The first data path 22 leads from the SCP 14 to the STP 18 over a data line utilizing SS7 standard protocol. The STP 18 then communicates with the SSP 12 over another leg in the data path 22 using the SS7 protocol. The SSP 12 reformats the message from the SCP 14 from SS7 into an Integrated Services Digital Network (ISDN) standard message which is then forwarded over the final leg of the first data path 22 to the IP 20. The IP 20 may return messages along the same data path 22.

The IP 20 is a network element of the AIN that contains resources to exchange information with an end user 10 and perform other functions such as call origination and tone generation. The IP 20 provides special resources for interactions between the end user 10 and the network such as dual tone multi-frequency (DTMF) recognition, playing announcements and tone generation. A services node/intelligent peripheral (SN/IP) platform is manufactured by Comverse Technology, Inc. that is suitable for use with a presently preferred system and method. One or more associated voice/information channels 21 also link the IP to the SSP. Although the telephone network illustrated in FIG. 1 shows only one of each network element, those of ordinary skill in the art will understand that the presently preferred method may be performed on more complex networks having a plurality of interconnected SCP's, IP's, STP's, and SSP's.

In addition to communicating with the SCP 14 through the SSP 12, the IP 20 and SCP 14 preferably communicate over a second data path 24 that bypasses the SSP 12 and preferably directly connects the SCP 14 and IP 20 through the STP 18. The first data path 22 connecting the SCP 14 and the IP 20 through the STP 18 and SSP 12 preferably implements the Bellcore GR-1129-Core Intelligent Peripheral Interface. The second, or direct, data path 24 permitting communication between the SCP 14 and IP 20 and bypassing the SSP 12 preferably uses a different interface hereinafter referred to as the direct SCP-IP interface.

As described in greater detail below, the presently preferred method of mixed mode SCP-IP communication implements select features of the GR-1129 document which describes the SCP-SSP-IP interface and implements the direct SCP-IP interface discussed herein. A suitable direct SCP-IP interface is set forth in a publication by Ericsson entitled SCP-IP Interface Function Requirements, No. EAU/T/S 1056-P8AIN/012 Uen (hereinafter "the Ericsson interface"). This document describes one set of interface requirements for direct communication between the SCP and IP without communicating through an SSP. In a preferred embodiment, the direct SCP-IP interface is a selected portion of the Ericsson interface.

The direct SCP-IP interface preferably tranfers messages through the STP 18 utilizing the ANSI SS7 transaction capabilities application part (TCAP) as the data transport layer. Other data paths may also be implemented. For example, in one alternative configuration a local area network or ethernet connection 23 may be used rather than a connection through the STP 18. In a preferred embodiment, the SCP 14 includes an interface mediator 25 for coordinating which of the two data paths 22,24, and thus which of the respective interfaces for the data paths, are used during call processing.

The preferred direct SCP-IP interface provides for specific information exchanges over the direct data path between the SCP 14 and IP 20 via the STP 18 when the services of an AIN system are invoked. These predetermined exchanges of data utilize predefined messages carrying necessary parameters between the SCP 14 and the IP 20. The predetermined messages utilized in the direct SCP-IP interface can be categorized as messages that the SCP may send to the IP and messages the IP can send to the SCP.

The SCP can send the Establish_IP_Transaction, Send_To_Resource, Call_Info_To_Resource and Cancel_Resource messages. The Establish_IP_Transaction message transmits protocol version ID, port requests, information on the type of AIN trigger received, as well as leg and user ID's. The leg and user ID's identify the call originations and terminations at the IP and the user whose call is requesting the services. Optionally, the Establish_IP_Transaction message may include a service provider ID for unique parameter handling. Also optional is a pre-allocation parameter that the SCP can use to reserve IP resources for a transaction. An extension parameter is available to carry service provider parameters specific to custom service logic for the service provider if the service provider uses custom service logic.

The Send_To_Resource message carries an initial set of instructions to the IP that will vary depending on the service requested by an end user. The SCP can send parameters requiring the IP to perform tasks such as keeping a transaction open, playing a prerecorded message, collecting billing information and so on. A predetermined set of parameters may be included in this message. The parameters sent in this message will depend on the task that the IP must execute.

The Call_Info_To_Resource message is used by an SCP to transmit information when subsequent IP resources or more caller interaction are necessary. This message is similar to the Send_To_Resource message but is used after that message to continue an existing SCP-IP dialog. Most of the parameters used in the Send_To_Resource message are preferably accessible. The Cancel_Resource message allows the SCP to selectively cancel a transaction. A transaction identification or other information parameters may be sent in this message to identify the particular transaction to be canceled. The IP will respond with a Resource_Clear to the Cancel_Resource message received from the SCP.

The IP has a related set of messages: IP_Trans_Establish_Info, Call_Info_From_Resource, and Resource_Clear. The IP_Trans_Establish_Info message can provide the SCP with the IP's protocol version, an incoming port ID for the call to be forwarded to, additional channels that have been reserved, and the result of the resource allocation request from the SCP. The message may also contain a service provider ID and an extension parameter if additional parameters are needed for a service provider's custom service logic.

To return intermediate results to the SCP, the IP sends a Call_Info_From_Resource message. The parameters contained in the message will depend on the SCP message being answered but can provide service provider ID, operation results, resource allocation results, new channel directory numbers for resources reserved by the SCP, canceled resource result and an extension parameter for use with any information required of a custom service logic required by a service provider. An IP will end a transaction and inform the SCP of results from previous instructions with the Resource_Clear message. This message returns a parameter describing the cause for closing the transaction to the SCP. Parameters carrying the results of any operations by the IP may also be sent in this message.

Using the message structure described above, some basic functional blocks predefined in the direct SCP-IP interface include transaction initiation, initial incoming call termination, play announcement, play announcement and collect digits, play announcement and collect digits with verify, speech recognition, call origination, unconditional transfer, resource allocation, fax detection, IP resource usage billing, and handoff of service processing to IP.

The transaction initiation function is invoked when an AIN capable SSP 12 receives a call from an end user that requires the services of the AIN system. Upon receipt of an AIN query from an SSP, the SCP 14 sends out an Establish_IP_Transaction query to the IP 20 to request reservation of a specific port or ports at the IP 20 to which the SCP 14 may direct the call. After receiving this message, the IP 20 selects and reserves a port or ports for the call. The IP 20 also reserves any requested information resources. The IP 20 then returns an IP_Trans_Establish_Info message which provides the SCP 14 with the incoming port ID. The incoming port ID is the IP's directory number to which the SCP 14 will direct the call. Included with the transaction initiation function is an exchange between the SCP 14 and IP 20 of protocol versions to insure compatibility of the transaction.

The initial incoming call termination function of the preferred direct SCP-IP interface performs the step of establishing a voice path from an end user 10 to the IP 20. After completion of the transaction initiation function, the SCP 14 provides the IP 20 with initial resource handling instructions such as whether to play an announcement, collect digits, or perform other functions the IP 20 is capable of. The SCP 14 transmits these instructions in a Send_To_Resource message. The SCP 14 also sends a message to the SSP 12 ordering transfer of the call to the IP 20 at the directory number received earlier. Once the voice path is established between the SSP 12 and IP 20, the IP 20 carries out the SCP 14 resource instructions received in the initial Send_To_Resource message. If the SSP 12 did not direct the call to the IP 20 within a specified time period the IP 20 will time out and send a Resource_Clear message to the SCP 14 indicating a failure of the transaction.

Once the transaction initiation and initial incoming call termination functions have been executed, the preferred direct SCP-IP interface provides for specific functions associated with particular services that a call from an end user 10 invokes The play announcement function permits the SCP 14 to instruct the IP 20 to play one or more announcements over the two legs of the voice channel 16, 21 to the end user 10. The IP 20 is capable of generating one or more concatenated announcements to be played over the voice channel. An announcement may be specified as interruptible or uninterruptible. For an interruptible announcement, the announcement will terminate when a voice or a dual tone multiple frequency (DTMF) tone is detected, and any additional announcements specified by the same message or instruction will not be played. All uninterruptible announcements are played first followed by any concatenated interruptible announcements. The SCP 14 preferably sends the play announcement function request in the Send_To_Resource and Call_Info_To_Resource messages. At the completion of the announcement, the IP 20 sends a Resource_Clear message to the SCP 14 to close the transaction. The SCP 14 may instruct the IP 20 to stay on line after the announcement is finished and remain available for further instructions from the SCP 14. In such a case, the IP 20 preferably returns the result Call_Info_From_Resource to the SCP 14 and the transaction remains open.

A play announcement function defined in the preferred direct SCP-IP interface is modified in two related functions: the play announcement and collect digits functions and the play announcement and collect digits with verify function. As with the play announcement function the SCP 14 instructs the IP 20 to perform a desired function in a request sent in the Send_To_Resource and Call_Info_To_Resource messages. The play announcement and collect digits functions includes the additional step of the IP 20 collecting digits entered by an end user and returning them to the SCP 14 in a predetermined parameter of the Call_Info_From_Resource or Resource_Clear messages. The play announcement and collect digits with verify function instructs the IP 20 to collect the digits entered by the end user and verify this digit information according to the data type provided by the SCP. The data type is provided in the Send_To_Resource or Call_Info_To_Resource message and may be, for example, a 7–10 digit telephone number. Again, the result of the operation is returned to the SCP 14 in a predetermined parameter of Call_Info_From_Resource or Resource_Clear messages.

A call origination function permits the SCP 14 to instruct the IP 20 to originate a call to another destination. The SCP 14 may provide this instruction in either the Send_To_Resource or Call_Info_To_Resource messages. The SCP 14 provides the IP 20 with the call party number to dial and the IP 20 originates a call through the SSP 12.

Utilizing the unconditional transfer function, the SCP 14 can instruct the IP 20 to transfer a call to another destination. The unconditional transfer function comprises the SCP 14 sending the transfer instruction in the Call_Info_To_Resource or Send_To_Resource message to the IP 20. The IP 20 can then transfer the call to the designated party. The IP 20 returns the result of the transfer to the SCP 14 in either the Resource_Clear or Call_Info_From_Resource messages if the SCP 14 indicated a need to do so when ordering the call transferred.

The resource allocation function of the preferred direct SCP-IP interface provides a procedure for the SCP 14 to instruct the IP 20 to preallocate a resource that may be needed later in a call or to deallocate a resource that is no longer necessary. The SCP 14 sends the IP 20 resource handling instructions in the Establish_IP_Transaction, Call_Info_To_Resource, and Send_To_Resource messages. Preferably the instructions are sent in a predetermined parameter within these messages to indicate whether the IP 20 is to preallocate or deallocate resources. The IP 20 subsequently informs the SCP 14 of the resource allocation request result in the message Call_Info_From_Resource or Resource_Clear.

Detection of incoming faxes is a common need in telephone networks and the preferred SCP-IP interface includes a fax detection function. When the initial terminating call to the IP 20 could be a fax call, the SCP 14 must tell the IP 20 to prepare for this type of call. Following the transaction initiation function the SCP 14 sends the operational instruction for fax detection in the message Send_To_Resource. If there is a chance that the IP 20 might be receiving a call from either a person or a fax machine, the SCP 14 may also provide a request to the IP 20 to play an announcement during the period of time that it is attempting to detect a fax signal. This announcement ID will be indicated within a fax detect operation parameter.

The SCP 14 may also send additional operational requests to the IP 20 to be acted upon if the IP 20 determines the call is not a fax call. These requests, in addition to the request for fax detection must be sent in multi-components. Multi-components consist of message segments, each containing separate instructions. Using multi-component messages, the IP can return results to the SCP as it completes processing the instruction in each component.

When the IP 20 receives the initial terminating call from the SSP, it will play an announcement while determining the call type if requested by the SCP 14. If a fax call is detected, the IP 20 transmits this information to the SCP 14 in the Call_Info_From_Resource message. The SCP 14 will respond with instructions for handling the fax call.

For a non-fax call, the IP 20 will send the SCP 14 a Call_Info_From_Resource message with an appropriate fax detection parameter indicating this result. The IP 20 will then perform any requests sent in a multi-component message in the order received. If no operational requests were provided for a non-fax call, the IP 20 will wait for instructions from the SCP 14 after sending the Call_Info_From_Resource message.

The IP resource usage billing function lets the SCP 14 instruct the IP 20 to generate and format records for IP resource billing. Preferably the SCP 14 provides the IP 20 with AMA billing information to coordinate IP record keeping. The SCP-IP AMA interface is preferably based on GR-1299-CORE published by Bellcore.

Using the handoff of service processing to IP function, the SCP 14 may handoff the continuation of service execution to the IP 20. The handoff request may be sent in either the Send_To_Resource or Call_Info_To_Resource message. The handoff contains all information the IP 20 needs to direct it to the specific call processing logic it needs to complete the service. Should the SCP 14 desire any return of information from the IP 20, the SCP 14 may specify the type of response it requires. For example, the SCP 14 can request an acknowledgment with no results or a response message with results.

Figure 2:
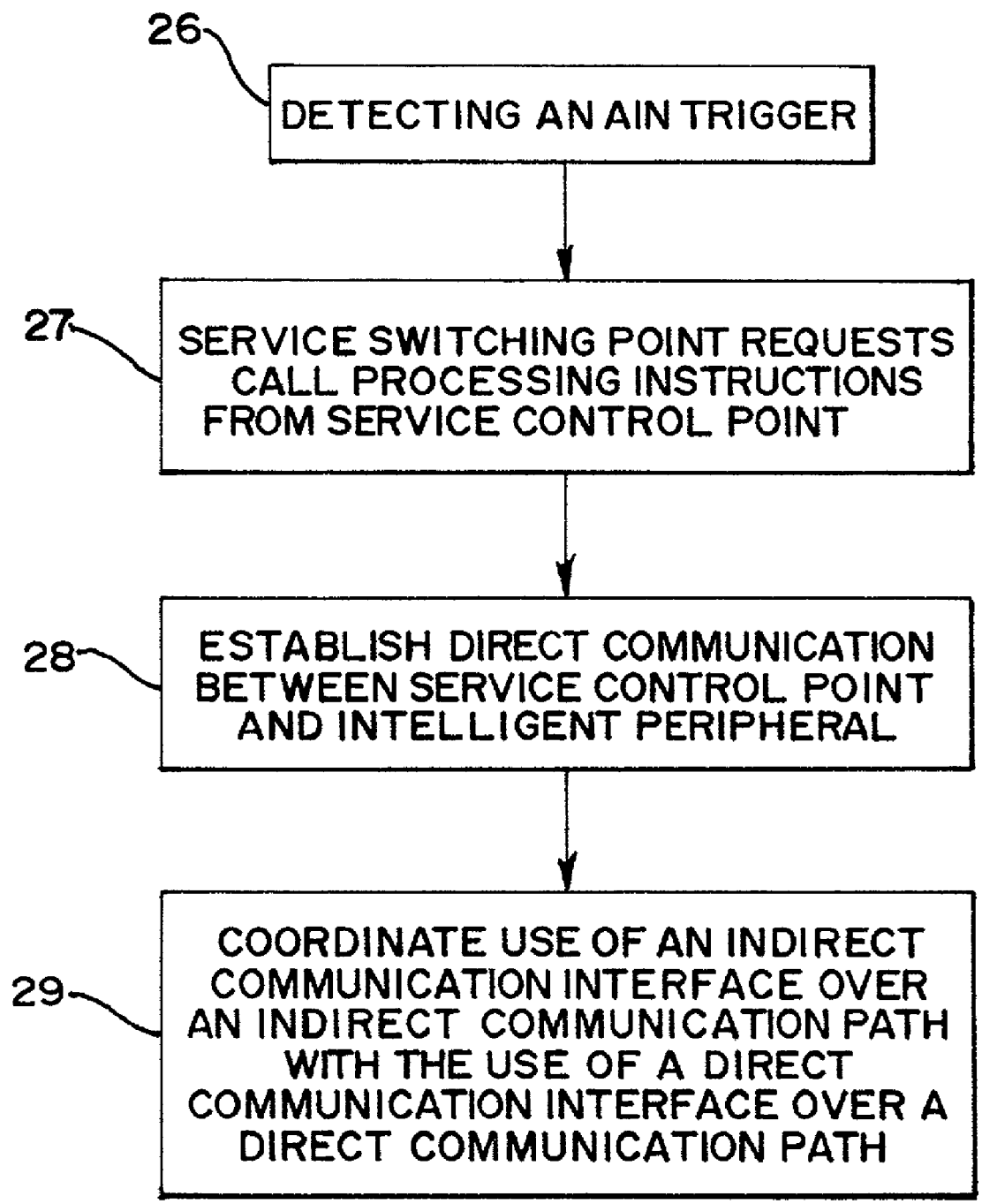
FIG. 2 is a flow chart showing a preferred embodiment of the present invention.

FIG. 2 shows a flow chart of a preferred embodiment of the method of the present invention using the telephone system 10 and SCP-IP interfaces described above. A telephone call from an end user that will require AIN resources is detected at the SSP as an AIN trigger (at step 26). The SSP subsequently requests call processing instructions from the SCP 14 (at step 27). Assuming that the call processing instructions will include the direct data path 24 and the associated direct SCP-IP interface, direct communication between the SCP and the IP is established (at step 28). Use of the indirect interface over the indirect data path 22 and the direct interface over the direct data path 24 is then coordinated to process the telephone call (at step 29).

In one embodiment, a subset of the GR-1129 interface is used as the indirect SCP-IP interface. The selected portions preferably include messages and parameters necessary to open a transaction via the SSP to the IP, communicate intermediate results without closing a transaction, complete a transaction at the IP, and cancel a resource event. Elements of the GR-1129 interface that are unnecessary include non-call associated signaling, any requirements involving ISDN BRI, and the Connect_To_Resource message defined in the regular GR-1129 interface. The subset of GR-1129 selected is optimized for use with the direct SCP-IP interface under the direction the service logic through the use of the interface mediator 25 in the SCP.

Figure 3:
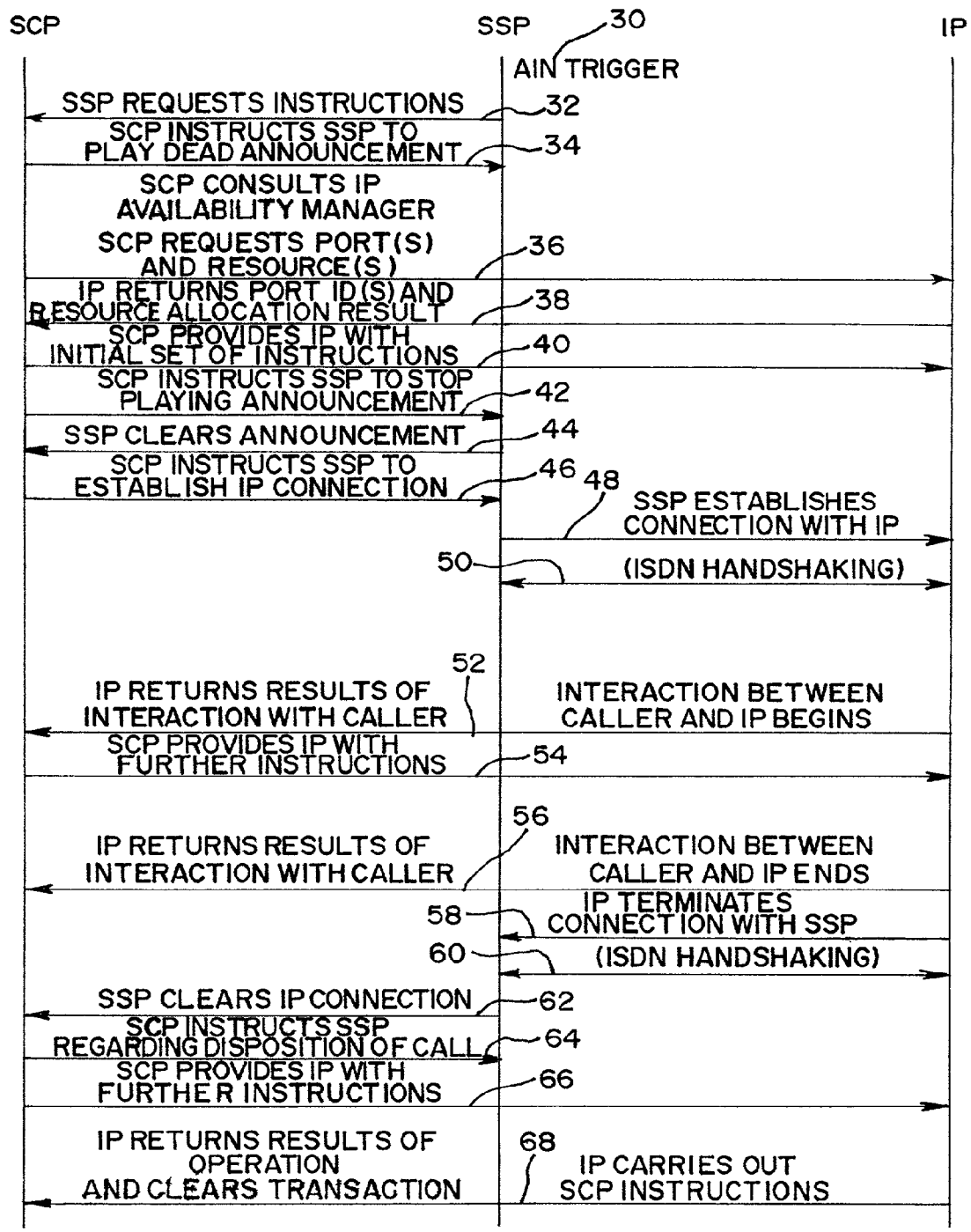
FIG. 3 is a call flow diagram illustrating a preferred embodiment of the method of communication between the SCP and IP.

Referring now to FIG. 3, a call flow diagram illustrating a preferred method of handling a telephone call using select elements of the GR-1129 interface and the direct SCP-IP interface described above is shown. A telephone call from an end user first arrives at the SSP 12. The SSP 12 recognizes an AIN trigger, knows that the call will require AIN resources, and requests instructions from the SCP 14 (at steps 30, 32). The SCP 14 subsequently instructs the SSP 12, via a Send_To_Resource message, to play a message to the end user (at step 34). The message may be any pre-recorded message but is preferably a "dead" message that plays a period of silence to the end user. The dead message is played to prevent a timeout for the SCP-SSP transaction while the SCP 14 attempts to establish a connection with the IP 20 over the direct SCP-IP interface.

The SCP 14 next consults the IP availability manager. The IP availability manager is a table stored in the SCP listing available IP's, addresses of IP's and available resources in these IP's. Initiating direct SCP-IP communications over the direct data path 24, the SCP 14 uses the transaction initiation function and queries the IP 20 with an Establish_IP_Transaction message requesting reservation of one or more ports and resources (at step 36). The IP 20 receives the message, reserves the requested ports and resources, and returns the port ID's and resource allocation results to the SCP 14 in an IP_Trans_Establish_Info message (at step 38). Invoking the initial incoming call termination function, the SCP 14 provides the IP 20 with an initial set of instructions (at step 40). The SCP 14 sends these instructions over the direct data path 24 in a Send_To_Resource message. The SCP 14 instructs the SSP 12 to discontinue the dead message and the SSP 12 clears the announcement (at steps 42, 44). The SCP 14 next instructs the SSP 12 to establish a voice channel with the IP 20 (at step 46). The SSP 12 establishes the voice channel and the SSP 12 and IP 20 exchange ISDN handshaking messages to verify the connection (at steps 48, 50).

After establishing the voice channel, the SSP and IP 20 interact according to the instructions sent earlier by the SCP 14 to the IP. The IP 20 provides the necessary services required by the call such as playing custom messages, collecting digits, or any other predetermined telecommunications functions. At the completion of the services the end user requires from the IP 20, the IP returns any collected information to the SCP 14 in a Call_Info_From_Resource message (at step 52). This message is sent over the direct data path 24 using the direct SCP-IP interface.

The SCP 14 may then request that the IP 20 provide additional services if the end user's call requires additional interaction with the IP (at step 54). The SCP 14 again instructs the IP 20 to execute certain tasks. The IP returns the results of the subsequent interaction to the SCP 14 and terminates the connection to the SSP 12 (at steps 56, 58). After the standard ISDN handshaking takes place, the SSP 12 informs the SCP 14 that the connection has been cleared (at steps 60, 62). The SCP instructs the SSP regarding the disposition of the call (at step 64). For example, the SCP may instruct the SSP to forward the call to another number. At this point, the SCP 14 may choose not to release the IP 20 and retain the services of the IP 20 for further activities independent of the initial call that encountered the AIN trigger and invoked the SCP-IP transaction. The SCP 14 again instructs the IP 20 to execute certain tasks and the IP returns the results (at steps 66, 68). The IP 20 clears the transaction with the SCP 14 after completing all requested tasks.

Figure 4:
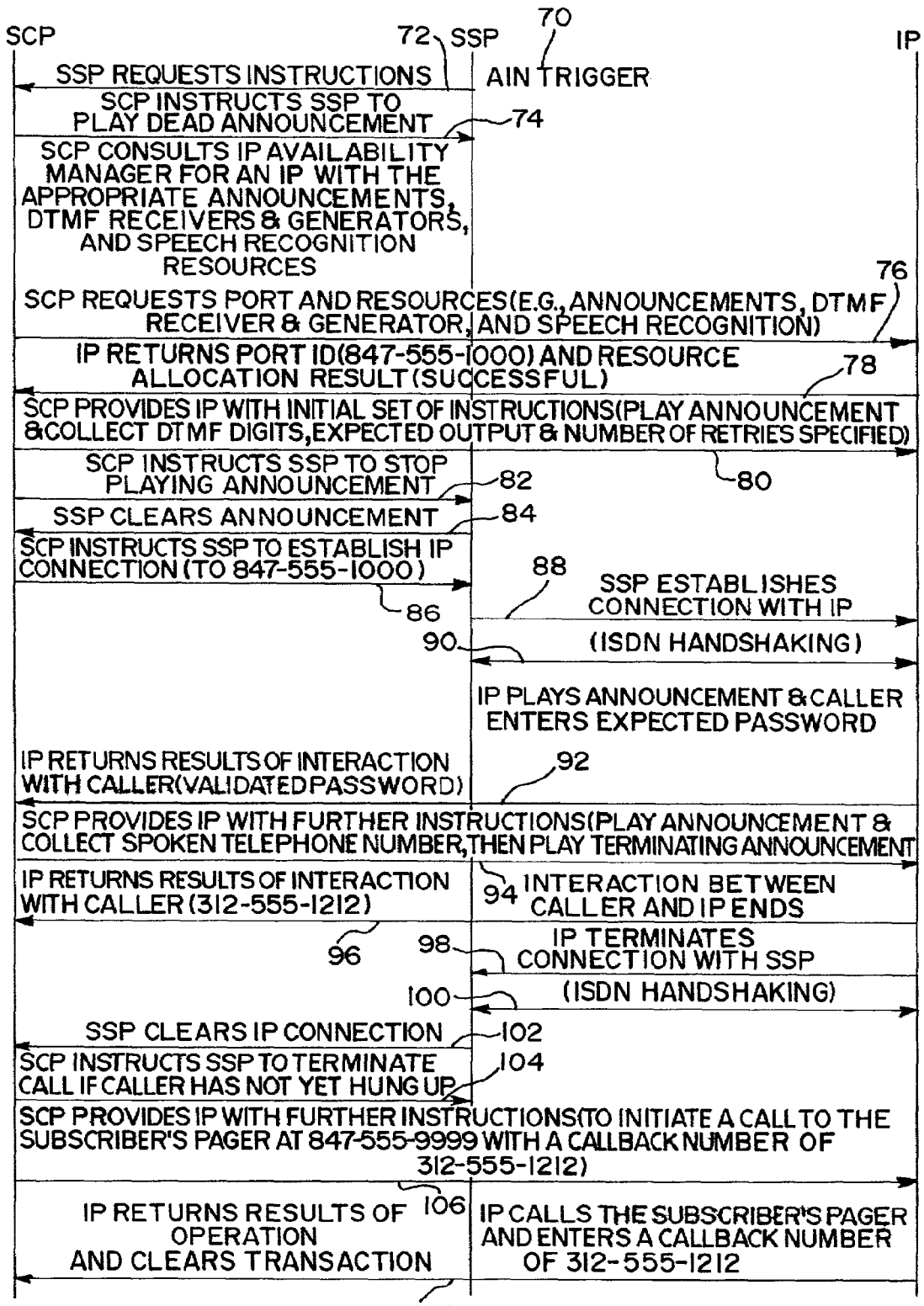
FIG. 4 is a call flow diagram of an alternative embodiment of the method shown in FIG. 3.

FIG. 4 illustrates one of a number of specific transactions that may be executed utilizing the preferred method described in FIGS. 2 and 3. The transaction of FIG. 4 shows the call processing executed when a telephone call is made to a company subscribing to a custom paging service offered by a service provider. When the caller dials the company and receives no answer a message is played. The caller can interrupt the message by dialing a password. The password grants the caller access to a paging function that plays a message and collects spoken digits representing a number where the caller can be reached. Another message is played acknowledging the transaction, and the subscribing company is then paged and provided with the spoken number so that the company may return the caller's telephone call.

According to an embodiment of the present invention, the above example of a telephone service is executed in the discrete steps described below. The call encounters an AIN trigger causing the SSP 12 to request instructions from the SCP 14 (at steps 70, 72). The SCP 14 instructs the SSP 12 to play a dead announcement and, using the direct SCP-IP interface, consults with the IP 20 (at step 74). By using the direct SCP-IP interface in this transaction the SCP 14 can first determine if the IP has the resources available to handle the call. If the IP 20 does not have proper or sufficient resources to handle the call, the SCP 14 will contact another IP. Depending on the resources the call will need, the SCP 14 may pre-allocate all of the resources at the IP 20 necessary for the entire transaction and designates the appropriate ports for the call. In this manner, the SCP 14 can make sure resources are available for the call for more than just the first set of instructions to the IP.

As shown in FIG. 4, the SCP 14 requests resources for announcements, a dual tone multi frequency (DTMF) receiver and generator, and speech recognition functions (at step 76). The IP 20 returns a port ID, preferably a telephone number, to which the call may be forwarded to access the allocated resources (at step 78). In addition, the IP 20 indicates that a successful resource allocation has been arranged. The SCP 14 next sends the IP 20 the initial instructions to play an announcement, collect dialed digits of a password, expect a specific type of response and allow a predetermined number of password attempts (at step 80). The SCP 14 instructs the SSP 12 to end the dead announcement and establish the voice path between the end user and the IP 20 at the IP port ID number (at steps 82, 84). The SSP 12 establishes the connection, the IP 20 executes the SCP's instructions, and the IP informs the SCP 14 that a correct password (the expected answer) was received (at steps 86, 88, 90 and 92).

Upon receipt of the IP's message, the SCP 14 provides the IP 20 with further instructions to play an announcement to the end user (e.g., "please state the number where you can be reached"), collect a spoken telephone number, and play a terminating message (at step 94). These resources are all available because of the SCP's ability to reserve resources at the initiation of the call. The IP 20 returns the spoken number to the SCP 14 and terminates the voice connection with the SSP 12 (at steps 96, 98 and 100). The SSP 12 clears the IP 20 connection and receives instruction from the SCP 14 to end the call with the end user if the end user fails to hang up the phone (at steps 102, 104). The SCP 14 directly contacts the IP 20 to have the IP initiate a call to the subscriber's pager with additional instructions to send the call back number spoken by the end user 10 (at step 106). The IP 20 clears the transaction with the SCP 14 after returning the results to the SCP (at step 108).

The above embodiment of a method of processing telephone calls utilizing standard SCP-IP communications through the SSP 12 and direct SCP-IP communications that bypass the SSP 12 is advantageous in that the processing load on the SSP is reduced. An interface mediator 25 located at the SCP 14 preferably controls which data path, direct 24 or indirect 22, that the data will travel based on the service logic that the interface mediator 25 is executing. In one embodiment, the interface mediator may be a collection of service independent building blocks containing messages of all the different types of SCP-IP interfaces to be called upon by the service logic for different types of telephone services offered by a service provider. The service logic for supporting each type of telephone service preferably includes instructions that the SCP will execute dictating when the direct SCP-IP interface, using the direct data path, will be used and when an indirect data path will be used. For example, the service logic for a relatively simple service that plays an announcement and collects digits may include instructions for using the Bellcore GR-1129 interface over the indirect data path. For a more complex service, such as playing an announcement, collecting digits and taking additional action based on the results of the initial call, the service logic may include instructions for the SCP to use both a direct SCP-IP interface and a standard interface such as the Bellcore GR-1129 interface.

From the foregoing, an improved system and method of communication between elements of an advanced Intelligent Network has been described. The method coordinates the use of an indirect SCP-IP interface and a direct SCP-IP interface. This takes advantage of the strengths of the Bellcore GR-1129 interface and a direct SCP-IP interface to reduce the processing demands on service switching points. Additionally, the use of the direct SCP-IP interface allows for increased functionality and flexibility for expansion over GR-1129 by itself. The presently preferred method provides compatibility between interfaces and is capable of selecting either interface independently or using them in combination on the same network elements.

It is intended that the foregoing detailed description be regarded as illustrative rather than limiting, and that it be understood that the following claims, including all equivalents, are intended to define the scope of this invention.

We claim:

1. In an advanced intelligent network comprising a first network element for communicating with an end user, a call processing network element for managing call processing resources associated with a telephone call, a first data path permitting communication between the first network element and the call processing network element through an intelligent switch, and a second data path between the first network element and the call processing network element bypassing the intelligent switch, a method of processing telephone calls comprising:
  detecting a call processing trigger;
  the intelligent switch sending a request for call processing instructions to the call processing network element;
  establishing direct communication between the call processing network element and first network element over the second data path, wherein establishing direct communication between the call processing network element and first network element further comprises:
    the call processing network element initiating communication with the first network element over the second data path;

the call processing network element sending a resource request to the first network element; and the first network element sending an information message to the call processing network element over the second data path, wherein the first network element sends the call processing element at least one port ID and informs the call processing network element of any processing limitations;

the call processing network element providing the first network element with a set of instructions over the second data path and sending a second set of instructions to the intelligent switch conveying the port ID received from the first network element, wherein the port ID indicates the destination for the telephone call;

coordinating use of a first interface over the first data path with use of a second interface over the second data path, wherein the call processing network element exchanges information with the first network element over the first and second data paths; and the call processing network element maintaining communication with the intelligent switch to control disposition of the telephone call after first network element interaction with the telephone call.

2. The method of claim 1 wherein the call processing element maintaining communication with the intelligent switch comprises instructing the intelligent switch to play a delay announcement, wherein the call processing network element and first network element prepare appropriate call processing connections while the delay announcement is played.

3. The method of claim 1 wherein the first interface used over the first data path comprises a predetermined portion of a Bellcore GR-1129-CORE interface.

4. In an advanced intelligent network (AIN) comprising a first network element for communicating with an end user, a call processing network element for managing call processing resources associated with a telephone call, a first data path permitting communication between the first network element and the call processing network element through an intelligent switch, and a second data path between the first network element and the call processing network element bypassing the intelligent switch, a method of processing telephone calls comprising:

receiving a request for call processing instructions from the intelligent switch over a segment of the first data path;

sending instructions to the intelligent switch from the call processing network element over the segment of the first data path;

initiating a transaction between the call processing network element and the first network element by obtaining call processing resource information at the call processing network element from the first network element over the second data path, and instructing the intelligent switch over the segment of the first data path to establish a connection between the end user and the first network element based on the obtained call processing resource information;

transmitting interaction results to the call processing network element, wherein the interaction results comprise information received by the first network element from the end user related to a pager service subscriber, prior to terminating the connection between the end user and the first network element;

terminating the connection between the end user and the first network element and instructing the first network element over the second data path to perform additional tasks while maintaining the transaction between the call processing network element and the first network element; and wherein instructing the first network element over the second data path to perform additional tasks comprises instructing the first network element to initiate a telephone call to the pager service subscriber.

5. The method of claim 4, wherein the second interface is a selected portion of an Ericsson interface.

6. The method of claim 4, wherein the first interface is a selected portion of Bellcore GR-1129-CORE.

7. The method of claim 4, wherein the second data path comprises an ANSI SS7 transactions capabilities application part data transport layer.

8. The network of claim 4, wherein the second data path comprises an ethernet connection.

* * * * *